US007371324B2

(12) United States Patent
Jones et al.

(10) Patent No.: US 7,371,324 B2
(45) Date of Patent: May 13, 2008

(54) CHEMICAL PROCESS

(75) Inventors: Raymond Vincent Heavon Jones, Stirlingshire (GB); Joanne Emma Murray, Stirlingshire (GB); Jennifer Ann White, Stirlingshire (GB); Barry Stuart Crombie, Stirlingshire (GB); James Samuel Shane Rountree, Stirlingshire (GB); Jacqueline Ann Campbell, Stirlingshire (GB)

(73) Assignee: Syngenta Limited (GB)

( * ) Notice: Subject to any disclaimer, the term of this patent is extended or adjusted under 35 U.S.C. 154(b) by 0 days.

(21) Appl. No.: 10/332,107

(22) PCT Filed: Jun. 14, 2001

(86) PCT No.: PCT/GB01/02622

§ 371 (c)(1),
(2), (4) Date: Aug. 4, 2003

(87) PCT Pub. No.: WO02/02464

PCT Pub. Date: Jan. 10, 2002

(65) Prior Publication Data

US 2004/0035251 A1    Feb. 26, 2004

(30) Foreign Application Priority Data

Jul. 3, 2000    (GB)    .................. 00163360

(51) Int. Cl.
*B01D 11/00*    (2006.01)
(52) U.S. Cl. .................. 210/639; 210/634; 210/909; 568/749
(58) Field of Classification Search ................ 210/634, 210/639, 806, 909; 568/716, 748, 749, 324, 568/438
See application file for complete search history.

(56) References Cited

U.S. PATENT DOCUMENTS

| | | | |
|---|---|---|---|
| 3,355,456 A | 11/1967 | Sexton | |
| 3,609,158 A | 9/1971 | Torba | |
| 3,869,499 A * | 3/1975 | Heath et al. | 558/413 |
| 4,179,365 A * | 12/1979 | Sumi | 210/610 |
| 4,208,280 A | 6/1980 | Naylor | |
| 4,208,350 A * | 6/1980 | Hearon et al. | 568/324 |
| 4,370,483 A | 1/1983 | Papenfuhs | |
| 4,400,553 A * | 8/1983 | Aneja | 568/724 |
| 4,986,917 A * | 1/1991 | Adams et al. | 210/634 |
| 5,705,074 A * | 1/1998 | Brient | 210/634 |
| 5,801,241 A | 9/1998 | Lim et al. | |
| 6,071,409 A * | 6/2000 | Bondy et al. | 210/634 |

FOREIGN PATENT DOCUMENTS

| | | |
|---|---|---|
| DE | 763626 | 12/1952 |
| DE | 941544 | 3/1956 |
| ES | 2112095 | 3/1998 |
| GB | 716886 | 10/1954 |
| GB | 2305174 | 4/1997 |
| JP | 58154561 | 9/1983 |
| JP | 60084194 | 5/1985 |
| JP | 11347536 | 12/1999 |
| SU | 1883861 | 10/1966 |
| SU | 1786018 | 1/1993 |
| WO | 9729088 | 8/1997 |
| WO | 9840355 A1 | 9/1998 |
| WO | 0014068 A1 | 3/2000 |

OTHER PUBLICATIONS

Korenman Ya I: "Extraction of Phenol with Cyclohexanone from Aqueous Salt Solutions", Russian Journal of Applied Chemistry, vol. 71, No. 3, 1998, pp. 532-534.
Korenman, Ya I, et al.: "Derivatization as a Method for Improvement of the Efficiency of Extraction of Naphthols and Their Sulfo Derivatives", Chemical Abstracts, vol. 132, No. 7, Feb. 12, 2000.
Schramm, K.W. et al.: "A New Method for Extraction of C.I. Reactive Red 4 and its Derivates From Water", Water Research, vol. 22, No. 8, 1988, pp. 1043-1045.
Korenman, Ya I. et al.: "Study of Extraction of Naphthols and Nitrosonaphthols with Ethers", Chemical Abstracts, vol. 95, No. 20, Nov. 16, 1981.
Korenman, Ya I. et al.: "Extraction-photometric Determination of Phenol, Chlorophenols, and Naphthols in Drinking Water", Chemical Abstracts, vol. 97, No. 22, Nov. 29, 1982.
Korenman, Ya I. et al.: "Extraction and Photometric Determination of 1-naphthol in 2-naphthol-containing Aqueous Solutions", Chemical Abstracts, vol. 118, No. 10, Mar. 8, 1993.
Korenman, Ya I. et al.: "Extraction Preconcentration and Photometric Determination of Chlorophenol and Naphthols in Aqueous Media", Chemical Abstracts, vol. 122, No. 16, Apr. 17, 1995.
Korenman, Ya I. et al.: "Extraction of Naphthols from Aqueous Media", Journal of Applied Chemistry of the USSR, vol. 64, No. 7, 1991, pp. 1343-1346.

(Continued)

*Primary Examiner*—Joseph Drodge
(74) *Attorney, Agent, or Firm*—James Cueva

(57) ABSTRACT

A process for extracting from aqueous solution the alkali metal or ammonium salt of a phenol, naphthol, anthrol or phenanthrol or the corresponding thiol, which comprises contacting an aqueous alkaline or neutral solution of the alkali metal or ammonium salt, in which is dissolved an alkali metal or ammonium fluoride, chloride, bromide, hydroxide, nitrate, nitrite, sulphate, sulphite, sulphide, thiosulphate, phosphate, hydrogen phosphate, carbonate, bicarbonate, cyanate, cyanide, thiocyanate, borate, chlorate, chlorite, hypochlorite, perchlorate, chromate, dichromate or permanganate, with a partially water-miscible organic solvent so as to transfer aqueous solution of the alkali metal or ammonium salt of the phenol, naphthol, anthrol or phenanthrol or corresponding thiol into the solvent while retaining separate aqueous and solvent phases, and thereafter separating the solvent phase containing the alkali metal or ammonium salt and water from the aqueous phase, the ratio of solvent to water in the separated solvent phase being from 0.5:1 to 10:1 w/w.

12 Claims, No Drawings

OTHER PUBLICATIONS

Korenman, Ya I. et al.: "Correlation Dependence of Distribution Coefficients in Aromatic Hydroxy Compound-water Extraction Systems", Chemical Abstracts, vol. 123, No. 6, Aug. 7, 1995.

Ermolaeva, T.N. et al.: "Extraction of Sterically Hindered Butylphenols by Hydrophobic and Hydrophilic Solvents", Chemical Abstracts, vol. 122, No. 24, Jun. 12, 1995.

Ermolaeva, T.N. et al.: "Extraction of Phenol and its p-homologs by hydrophilic solvents", Chemical Abstracts, vol. 123, No. 14, Oct. 2, 1995.

Patent Abstracts of Japan, vol. 007, No. 277 (C-199), Dec. 9, 1983.

Shiao, Min Jen, et al., "Demethylation of Methoxypyridines with Sodium Trimethylsilanethiolate", HETEROCYCLES (1993), 36(2), 323-8, examples 2E, 2F.

G.R. Newkome, et al., "Chemistry of Heterocyclic Compounds, 17, Improved Synthesis of 2-Pyriodones", SYNTHESIS, vol. 10, 1974, p. 707.

Ya I. Korenman, Russian Journal of Applied Chemistry, vol. 71, No. 3 (1998), p. 532-534.

* cited by examiner

CHEMICAL PROCESS

This invention relates to a chemical process and more particularly to a process for extracting organic salts from aqueous solutions.

Cyclohexanone is known to be used to extract certain organic material from aqueous media (see for example U.S. Pat. No. 5,801,241 and U.S. Pat. No. 4,208,280). An article by Ya. I. Korenman et al in the *Russian Journal of Applied Chemistry*, Vol. 71, No. 3 [1998], 532-534, discusses the extraction of phenol with cyclohexanone from aqueous salt solutions and indicates that the most efficient extraction is achieved at a pH of about 2.

According to the present invention, there is provided a process for extracting from aqueous solution the alkali metal or ammonium salt of a phenol, naphthol, anthrol or phenanthrol or the corresponding thiol, which comprises contacting an aqueous alkaline or neutral solution of the alkali metal or ammonium salt, in which is dissolved an alkali metal or ammonium fluoride, chloride, bromide, hydroxide, nitrate, nitrite, sulphate, sulphite, sulphide, thiosulphate, phosphate, hydrogen phosphate, carbonate, bicarbonate, cyanate, cyanide, thiocyanate, borate, chlorate, chlorite, hypochlorite, perchlorate, chromate, dichromate or permanganate, with a partially water-miscible organic solvent so as to transfer aqueous solution of the alkali metal or ammonium salt of the phenol, naphthol, anthrol or phenanthrol or corresponding thiol into the solvent whilst retaining separate aqueous and solvent phases, and thereafter separating the solvent phase containing the alkali metal or ammonium salt and water from the aqueous phase, the ratio of solvent to water in the separated solvent phase being from 0.5:1 to 10:1 w/w.

The choice of solvent is determined by its ability to extract sufficient of the aqueous solution of the alkali metal or ammonium salt of the phenol, naphthol, anthrol or phenanthrol or corresponding thiol such that the ratio of solvent to water in the separated solvent phase is from 0.5:1 to 10:1 w/w, for example from 0.5:1 to 5:1 w/w and typically from 0.5:1 to 3:1 w/w.

The solvent:water ratio is readily determined by standard analytical techniques. Thus, the water content of the separated solvent phase can be measured using a Metrohm 784 KFP Titrino (supplied by Metrohm Ltd CH-9101 Herisau Switzerland) incorporating Hydranal-Composite 5K and Hydranal-Ketosolver reagents. These reagents are supplied by Riedel-de Haen Laborchemikalien GmbH and Co.KG, Postfach/PO Box 10 02 62, F-30918 Seelze, Germany. The salt content can be measured by a standard titration with hydrochloric acid and the solvent content can then be calculated by difference.

Suitable solvents include those solvents which can dissolve from 5 to 50% w/w, for example from 5 to 30% w/w, of water. They include alcohols such as n-butanol and iso-butyl alcohol, ketones such as methyl ethyl ketone and cycloalkanones.

Suitable cycloalkanones include cyclopentanone, cyclohexanone and cycloheptanone and alkyl-substituted cycloalkanones such as 2- and 3-methylcyclopentanone, 2,2- and 2,4-dinethylcyclopentanone, 2-, 3- and 4-methylcyclohexanone, 2,2- and 2,6-dimethylcyclohexanone, 2,2,6-trimethylcyclohexanone, 4-ethylcyclohexanone, 2-tert-butylcyclohexanone, 4-tert-butylcyclohexanone. Unsubstituted $C_{5-7}$ cycloalkanones are preferred, especially unsubstituted cyclohexanone. The quantity of solvent used will normally be 1 to 8 moles, for example 1 to 6 moles, typically 4 moles, for each mole of the alkali metal or ammonium salt of the phenol, naphthol, anthrol or phenanthrol or corresponding thiol present.

The phenol, naphthol, anthrol or phenanthrol or corresponding thiol may be any unsubstituted or substituted phenol, thiophenol, 1- or 2-naphthol or thionaphthol, hydroxy- or mercaptoanthracene such as 1- or 2-hydroxyanthracene, or hydroxy- or mercaptophenanthrene such as 1-, 2-, 3-, 4- or 9-hydroxyphenanthrene.

Suitably it is a compound of the general formula (I):

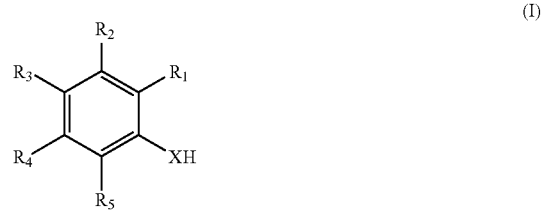

(I)

wherein X is S or O and any one of $R_1$ to $R_5$ is H or a substituent stable to the conditions of the process or $R_1$ and $R_2$ or $R_2$ and $R_3$ join to form a fused ring system or stable group. Typically, X is S or O and any one of $R_1$ to $R_5$ is H, halo, alkyl, haloalkyl, alkoxyalkyl, alkoxy, haloalkoxy, alkoxyalkoxy, alklylthio, haloalkylthio, cyano, nitro, amino, alkylamino, dialkylamino, alkylcarbonyl, alkoxycarbonyl, aminocarbonyl, alkylaminocarbonyl, dialkylaminocarbonyl, phenyl, phenoxy or phenylalkyl, or $R_1$ and $R_2$ or $R_2$ and $R_3$ join to form a fused benzene ring or naphthalene ring system in which the benzene ring or naphthalene ring system optionally carries one or more of the single substituents defined for $R_1$ to $R_5$ above.

Alkyl moieties, including the alkyl moieties of haloalkyl, alkoxy, alkylthio, etc., usually contain from 1 to 6, typically from 1 to 4, carbon atoms in the form of straight or branched chains. Examples are methyl, ethyl, n and iso-propyl, n-sec, iso- and tert-butyl, n-pentyl and n-hexyl.

Halo includes fluoro, chloro, bromo and iodo. Most commonly it is fluoro or chloro.

Haloalkyl is typically trifluoromethyl and haloalkoxy is typically trifluoromethoxy.

Alkylcarbonyl is typically acetyl and phenylalkyl is typically benzyl.

Alkali metals include lithium, sodium and potassium. Sodium and potassium are preferred for both the alkali metal salt of the phenol, etc., and the alkali metal fluoride, etc. Potassium is especially preferred.

The process of the invention is of particular interest for extracting alkali metal or ammonium salts of a compound of formula (I) where X is S or O (especially O), each of $R_1$ to $R_5$ is H or one of $R_1$ to $R_5$ is fluoro, chloro, bromo, $C_{1-4}$ alkyl, $C_{1-4}$ alkoxy, trifluoro-methyl, trifluoromethoxy, cyano or nitro or $R_1$ and $R_2$ or $R_2$ and $R_3$ join to form a fused benzene ring optionally carrying a substituent defined for $R_1$ to $R_5$ above, and the others are H.

The process is of especial interest for extracting alkali metal salts of 2-cyanophenol and 3-hydroxybenzotrifluoride.

The alkali metal or ammonium fluoride, chloride, bromide, hydroxide, nitrate, nitrite, sulphate, sulphite, sulphide, thiosulphate, phosphate, hydrogen phosphate, carbonate, bicarbonate, cyanate, cyanide, thiocyanate, borate, chlorate, chlorite, hypochlorite, perchlorate, chromate, dichromate or permanganate, which is dissolved in the aqueous alkaline or neutral solution of the alkali metal or ammonium salt of the phenol, naphthol, anthrol or phenanthrol or corresponding thiol, is required to effect separation of the aqueous and organic phases and increase extraction efficiency. Most suitably it is a sodium or potassium fluoride, chloride, sulphate or phosphate. The cation of the alkali metal or ammonium fluoride etc., may be the same as or different from the cation of the alkali metal or ammonium salt of the phenol, etc., but will often be the same. When a different cation is used, cation exchange may occur. For example, the potassium salt of the phenol, etc., may be extracted when potassium sulphate is used alongside the ammonium salt of the phenol, etc.

The amount of alkali metal or ammonium fluoride, etc., used will normally be at least 0.5 mole, usually 1.0 mole, for each mole of the alkali metal or ammonium salt of the phenol, etc., present.

In one aspect of the present invention there is provided a process for extracting from aqueous solution an alkali metal salt of 2-cyanophenol or 3-benzotrifluoride which comprises contacting an aqueous alkaline solution of the alkali metal salt, in which is dissolved an alkali metal halide, sulphate or phosphate, with a cycloalkanone, so as to transfer the metal salt into the cycloalkanone, and thereafter separating the cycloalkanone containing the metal salt from the aqueous solution.

The aqueous solution of the alkali metal or ammonium salt of the phenol etc., may be prepared by treating the phenol, etc., with an alkali metal hydroxide in water with or without the alkali metal or ammonium fluoride, etc., present. If not present, it may be added afterwards. Alternatively, the alkali metal or ammonium salt of the phenol etc., may be pre-formed. In this case, the aqueous solution may be kept neutral or made alkaline by the addition of a base, such as an alkali metal or ammonium hydroxide or carbonate.

The process of the invention is conveniently carried out by adding the organic solvent to the aqueous alkaline or neutral solution of the alkali metal or ammonium salt of the phenol, etc., containing the alkali metal or a ammonium fluoride etc., or vice versa, stirring or otherwise agitating the two-phase system until no further salt is extracted into the organic solvent phase and separating the two phases. The extraction can be carried out effectively at atmospheric pressure and at a temperature of from 0° C. to 90° C., normally from 15° C. to 80° C., for example from 20° C. to 70° C., especially from 50° C. to 70° C., and typically at about 60° C. The optimum agitation time will depend on the quantity of solution to be extracted, the amount of solvent used to carry out the extraction, the temperature and the efficiency of agitation. For example, for small scale extractions where about 0.03 moles of the alkali metal or ammonium salt are extracted from about 0.3 moles of water, 30 minutes stirring at 60° C. using 0.12 moles of solvent is usually sufficient to extract most of the alkali metal or ammonium salt.

The examples presented hereinafter show how the extraction can be done batch-wise but it will be apparent that it may also be done by continuous or counter-current extraction using standard chemical processing techniques.

2-Cyanophenol and 3-hydroxybenzotrifluoride are useful intermediates in the manufacture of, for instance, agrochemical products and are conveniently extracted as alkali metal or ammonium salts directly from the aqueous medium in which they are prepared.

The invention is illustrated by the following Examples in which:
g=grammes
GC=gas chromatography
mol=moles
° C.=degrees centigrade

EXAMPLE 1

This example illustrates the extraction of the potassium salt of 3-hydroxybenzotrifluoride from an aqueous solution containing potassium fluoride into cyclohexanone at 60° C.

A solution of potassium hydroxide flake (2.05 g at 95% strength, 0.03 mol), potassium fluoride (1.65 g, 0.03 mol) and 3-hydroxybenzotrifluoride (40.8 g, 0.03 mol) in water (5.2 g) was stirred for one hour at 60° C. Cyclohexanone (11.5 g, 0.12 mol) was charged and the solution was stirred for a further 30 minutes at 60° C.

The solution was transferred to a heated separating funnel where it was allowed to separate into two clear phases. The lower substantially aqueous phase was separated (4.5 g), followed by the upper substantially organic phase (18.91 g). Qualitative GC analysis showed that the cyclohexanone solution contained the potassium salt of 3-hydroxybenzotrifluoride in approximately 77% recovery.

EXAMPLE 2

This example illustrates the extraction of the potassium salt of 2-cyanophenol from an aqueous solution containing potassium fluoride into cyclohexanone at 60° C.

A solution of potassium hydroxide flake (2.05 g at 95% strength, 0.03 mol), potassium fluoride (1.65 g, 0.03 mol) and 2-cyanophenol (3.5 g, 0.03 mol) in water (5.2 g) was stirred for one hour at 60° C. Cyclohexanone (1.5 g, 0.12 mol) was charged and the solution was stirred for a further 30 minutes at 60° C.

The solution was transferred to a heated separating funnel where it was allowed to separate into two clear phases. The lower substantially aqueous phase was separated (4.12 g), followed by the upper substantially organic phase (17.02 g). Qualitative GC analysis showed that the cyclohexanone solution contained the potassium salt of 2-cyanophenol in approximately 63% recovery.

EXAMPLE 3

This example further illustrates the extraction of the potassium salt of 2-cyanophenol from an aqueous solution containing potassium fluoride into cyclohexanone at 60° C.

2-Cyanophenol (3.6 g@99% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 6.2 g and the upper substantially organic phase weighing 21.6 g were recovered.

The organic phase contained 27.7% water (by the Karl-Fischer titration) and 21.2% of the potassium salt of the 2-cyanophenol (by titration with hydrochloric acid), indicating that 97% of the salt had been extracted into the cyclohexanone.

The analytical method and calculation used is described below.

A sample of the extracted metal salt in solvent (~0.5 g) was accurately weighed and dissolved in deionised water (50 ml). A standardised 1% solution of potassium hydroxide (1 ml) was then added and the solution titrated with a 0.1M solution of hydrochloric acid. The results are calculated as follows.

$$\text{Salt content (\%)} = \frac{(EP2 - EP1) \times C32 \times C02}{C00 \times 100}$$

EP1 volume of hydrochloric acid added to first endpoint
EP2 volume of hydrochloric acid added to second endpoint
C00 sample weight
C02 molecular weight of salt
C32 strength correction factor for hydrochloric acid where: EP1=0.82 ml; EP2=7.688 ml; C00=0.5084 g; C02=157; C32=1

$$\text{Salt content (\%)} = \frac{6.868 \times 1 \times 157}{0.5084 \times 100} = 21.2$$

EXAMPLE 4

This example illustrates the extraction of the potassium salt of 3-cyanophenol from an aqueous solution containing potassium fluoride into cyclohexanone at 60° C.

3-Cyanophenol (3.6 g@99% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 6.3 g and the upper substantially organic phase weighing 21.5 g were recovered.

The organic phase contained 25.9% water (by the Karl-Fischer titration) and 20.5% of the potassium salt of the 3-cyanophenol (by titration with hydrochloric acid), indicating that 94% of the salt had been extracted into the cyclohexanone.

EXAMPLE 5

This example illustrates the extraction of the potassium salt of 4-cyanophenol from an aqueous solution containing potassium fluoride into cyclohexanone at 60° C.

4-Cyanophenol (3.8 g@95% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 6.7 g and the upper substantially organic phase weighing 21.1 g were recovered.

The organic phase contained 21.9% water (by the Karl-Fischer titration) and 23.0% of the potassium salt of the 4-cyanophenol (by titration with hydrochloric acid), indicating that >99% of the salt had been extracted into the cyclohexanone.

EXAMPLE 6

This example illustrates the extraction of the potassium salt of 2-bromophenol from an aqueous solution containing potassium fluoride into cyclohexanone at 60° C.

2-Bromophenol (5.3 g@98% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. Cyclohexanone (11.8 g, 0.120 mol) was then added, and the mixture stirred at 60° C. for 30 minutes. Two layers were formed, and these were separated at 60° C.

The lower substantially aqueous phase weighing 7.2 g and the upper substantially organic phase weighing 22.9 g were recovered.

The organic phase contained 24.6% water (by the Karl-Fischer titration) and 27.1% of the potassium salt of the 2-bromophenol (by titration with hydrochloric acid), indicating that 98% of the salt had been extracted into the cyclohexanone.

EXAMPLE 7

This example illustrates the extraction of the potassium salt of 3-bromophenol from an aqueous solution containing potassium fluoride into cyclohexanone at 60° C.

3-Bromophenol (5.3 g@98% strength, 0.030 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 6.0 g and the upper substantially organic phase weighing 23.3 g were recovered.

The organic phase contained 23.2% water (by the Karl-Fischer titration) and 27.6% of the potassium salt of the 3-bromophenol (by titration with hydrochloric acid), indicating that >99% of the salt had been extracted into the cyclohexanone.

EXAMPLE 8

This example illustrates the extraction of the potassium salt of 2-nitrophenol from an aqueous solution containing potassium fluoride into cyclohexanone at 60° C.

2-Nitrophenol (4.3 g@98% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 7.5 g and the upper substantially organic phase weighing 21.0 g were recovered.

The organic phase contained 20.5% water (by the Karl-Fischer titration) and 25.2% of the potassium salt of the 2-nitrophenol (by titration with hydrochloric acid), indicating that >99% of the salt had been extracted into the cyclohexanone.

EXAMPLE 9

This example illustrates the extraction of the potassium salt of 1-naphthol from an aqueous solution containing potassium fluoride into cyclohexanone at 60° C.

1-Naphthol (4.4 g@99% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 7.0 g and the upper substantially organic phase weighing 22.7 g were recovered.

The organic phase contained 21.9% water (by the Karl-Fischer titration) and 23.3% of the potassium salt of the 1-naphthol (by titration with hydrochloric acid), indicating that 97% of the salt had been extracted into the cyclohexanone.

EXAMPLE 10

This example illustrates the extraction of the potassium salt of 1-bromo-2-naphthol from an aqueous solution containing potassium fluoride into cyclohexanone at 60° C.

1-Bromo-2-naphthol (60.9 g@97% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 13.3 g and the upper substantially organic phase weighing 18.8 g were recovered.

The organic phase contained 10.4% water (by the Karl-Fischer titration) and 14.8% of the potassium salt of the 1-bromo-2-naphthol (by titration with hydrochloric acid), indicating that 36% of the salt had been extracted into the cyclohexanone.

EXAMPLE 11

This example illustrates the extraction of the potassium salt of 7-methoxy-2-naphthol from an aqueous solution containing potassium fluoride into cyclohexanone at 60° C.

7-Methoxy-2-naphthol (5.4 g@98% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 6.4 g and the upper substantially organic phase weighing 23.7 g were recovered.

The organic phase contained 25.8% water (by the Karl-Fischer titration) and 26.1% of the potassium salt of the 7-methoxy-2-naphthol (by titration with hydrochloric acid), indicating that 97% of the salt had been extracted into the cyclohexanone.

EXAMPLE 12

This example illustrates the extraction of the potassium salt of 2-thionaphthol from an aqueous solution containing potassium fluoride into cyclohexanone at 60° C.

2-Thionaphthol (4.9 g@98% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 6.9 g and the upper substantially organic phase weighing 21.9 g were recovered.

The organic phase contained 25.9% water (by the Karl-Fischer titration) and 20.0% of the potassium salt of the 2-thionaphthol (by titration with hydrochloric acid), indicating that 74% of the salt had been extracted into the cyclohexanone.

EXAMPLE 13

This example illustrates the extraction of the potassium salt of 2-chlorobenzenethiol from an aqueous solution containing potassium fluoride into cyclohexanone at 60° C.

2-Chlorobenzenethiol (4.4 g@99% strength, 0.03 mol), aqueous potassium hydroxide solution (60.7 g@30% w/w, 0.036 mol) and water (6 g, 0.3 ol) were charged to a stirred tube and heated to 60° C. The mixture was held at this temperature for 1 hour, then potassium fluoride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 6.5 g, and the upper substantially organic phase weighing 22.3 g were recovered.

The organic phase contained 31.8% water (by the Karl-Fischer titration) and 21.4% of the potassium salt of the 2-chlorobenzenethiol (by titration with hydrochloric acid), indicating that 87% of the salt had been extracted into the cyclohexanone.

EXAMPLE 14

This example illustrates the extraction of the potassium salt of 2-cyanophenol from an aqueous solution containing potassium fluoride into n-butanol at 60° C.

2-Cyanophenol (3.6 g@99% strength, 0.03 mol), aqueous potassium hydroxide solution (6.7 g@30% w/w, 0.036 mol)

and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. n-Butanol (9.0 g, 0.12 mol) was then added, and the mixture stirred at 60° C. for 30 minutes. Two layers were formed, and these were separated at 60° C.

The lower substantially aqueous phase weighing 5.5 g and the upper substantially organic phase weighing 19.5 g were recovered.

The organic phase contained 36.3% water (by the Karl-Fischer titration) and 23.4% of the potassium salt of the 2-cyanophenol (by titration with hydrochloric acid), indicating that 97% of the salt had been extracted into the n-butanol.

EXAMPLE 15

This example illustrates the extraction of the potassium salt of 2-cyanophenol from an aqueous solution containing potassium fluoride into methyl ethyl ketone at 60° C.

2-Cyanophenol (3.6 g@99% strength, 0.03 mol), aqueous potassium hydroxide solution (6.7 g @30% w/w, 0.036 mol) and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. Methyl ethyl ketone (8.7 g, 0.12 mol) was then added, and the mixture stirred at 60° C. for 30 minutes. Two layers were formed, and these were separated at 60° C.

The lower substantially aqueous phase weighing 4.8 g and the upper substantially organic phase weighing 19.6 g were recovered.

The organic phase contained 42.9% water (by the Karl-Fischer titration) and 23.4% of the potassium salt of the 2-cyanophenol (by titration with hydrochloric acid), indicating that 97% of the salt had been extracted into the methyl ethyl ketone.

EXAMPLE 16

This example illustrates the extraction of the potassium salt of 2-cyanophenol from an aqueous solution containing potassium fluoride into isobutyl alcohol at 60° C.

2-Cyanophenol (3.6 g@99% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium fluoride (1.8 g, 0.03 mol) was added and stirred for a further 15 minutes. Isobutyl alcohol (9.1 g, 0.12 mol) was then added, and the mixture stirred at 60° C. for 30 minutes. Two layers were formed, and these were separated at 60° C.

The lower substantially aqueous phase weighing 5.9 g and the upper substantially organic phase weighing 19.5 g were recovered.

The organic phase contained 35.7% water (by the Karl-Fischer titration) and 23.0% of the potassium salt of the 2-cyanophenol (by titration with hydrochloric acid), indicating that 95% of the salt had been extracted into the isobutyl alcohol.

EXAMPLE 17

This example illustrates the extraction of the potassium salt of 2-cyanophenol from an aqueous solution containing potassium phosphate into cyclohexanone at 60° C.

2-Cyanophenol (3.6 g@99% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium phosphate (6.6 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 12.5 g and the upper substantially organic phase weighing 20.0 g were recovered.

The organic phase contained 26.3% water (by the Karl-Fischer titration) and 24.7% of the potassium salt of the 2-cyanophenol (by titration with hydrochloric acid), indicating that >99% of the salt had been extracted into the cyclohexanone.

EXAMPLE 18

This example illustrates the extraction of the potassium salt of 2-cyanophenol from an aqueous solution containing potassium chloride into cyclohexanone at 60° C.

2-Cyanophenol (3.6 g@99% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then potassium chloride (20.3 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 4.1 g and the upper substantially organic phase weighing 29.4 g were recovered.

The organic phase contained 28.5% water (by the Karl-Fischer titration) and 14.0% of the potassium salt of the 2-cyanophenol (by titration with hydrochloric acid), indicating that 87% of the salt had been extracted into the cyclohexanone.

EXAMPLE 19

This example illustrates the extraction of the salt of 2-cyanophenol from an aqueous solution containing sodium chloride into cyclohexanone at 60° C.

2-Cyanophenol (3.6 g@99% strength, 0.03 mol), aqueous potassium hydroxide solution (6.7 g@30% w/w, 0.036 mol) and water (6 g, 0.3 mol) were charged to a stirred tube and heated to 60° C. The mixture was held at this temperature for 1 hour, then sodium chloride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 0.6 g and the upper substantially organic phase weighing 26.8 were recovered.

The organic phase contained 48.1% water (by the Karl-Fischer titration) and 17.2% of the salt of the 2-cyanophenol (by titration with hydrochloric acid), indicating that 98% of the salt had been extracted into the cyclohexanone.

EXAMPLE 20

This example illustrates the extraction of the sodium salt of 2-cyanophenol from an aqueous solution containing sodium chloride into cyclohexanone at 60° C.

2-Cyanophenol (3.6 g@99% strength, 0.03 mol), sodium hydroxide (1.5 g@97% strength, 0.036 mol) and water (9.5 g) were charged to a stirred tube and heated to 60° C. The mixture was held at this temperature for 1 hour, then sodium chloride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 4.5 g and the upper substantially organic phase weighing 21.8 g were recovered.

The organic phase contained 33.6% water (by the Karl-Fischer titration) and 20.8% of the sodium salt of the 2-cyanophenol (by titration with hydrochloric acid), indicating that 96% of the salt had been extracted into the cyclohexanone.

EXAMPLE 21

This example illustrates the extraction of the salt of 2-cyanophenol from an aqueous solution containing sodium chloride into cyclohexanone at 60° C.

2-Cyanophenol (3.6 g@99% strength, 0.03 mol), potassium carbonate (5.1 g@98% strength, 0.036 mol) and water (17.8 g) were charged to a stirred tube and heated to 60° C. The mixture was held at this temperature for 1 hour, then sodium chloride (1.8 g, 0.03 mol) was added and stirred for a further 15 minutes. Cyclohexanone (11.8 g, 0.12 mol) was then added, and the mixture stirred at 60° C. for 30 minutes. Two layers were formed, and these were separated at 60° C.

The lower substantially aqueous phase weighing 19.3 g and the upper substantially organic phase weighing 19.0 g were recovered.

The organic phase contained 34.5% water (by the Karl-Fischer titration) and 23.8% of the salt of the 2-cyanophenol (by titration with hydrochloric acid), indicating that 96% of the salt had been extracted into the cyclohexanone.

EXAMPLE 22

This example illustrates the extraction of the potassium salt of 2-cyanophenol from an aqueous solution of the ammonium salt of 2-cyanophenol containing potassium sulphate into cyclohexanone at 60° C.

2-Cyanophenol, ammonium salt, (5.2 g@99%, 0.0375 mol) was dissolved in water (30 g) and potassium sulphate (4.8 g@99%, 0.0275 mol) added. The mixture was heated up to 60° C., and then cyclohexanone (14.8 g, 0.15 mol) was added. Agitation was maintained for a further 30 minutes and then discontinued. Two layers were formed, and these were separated at 60° C.

The lower substantially aqueous phase weighing 32.8 g and the upper substantially organic phase weighing 18.0 g were recovered.

The organic phase contained 26.3% water (by the Karl-Fischer titration) and 22.8% of the potassium salt of the 2-cyanophenol (by titration with hydrochloric acid), indicating that 86.9% of the salt had been extracted into the cyclohexanone.

The aqueous layer was treated with base and a large amount of ammonia gas was given off. The organic layer was treated in the same way and no ammonia was detected. From this, and the similarity of behaviour when titrated, it was deduced that the potassium salt of 2-cyanophenol was extracted into the cyclohexanone leaving behind the more soluble ammonium sulphate.

The invention claimed is:

1. A process for extracting from aqueous solution the alkali metal or ammonium salt of a phenol, naphthol, anthrol or phenanthrol or the corresponding thiol, comprising:
    a) (i) providing a preformed aqueous alkaline or neutral solution of the alkali metal or ammonium salt of the phenol, naphthol, anthrol or phenanthrol or the corresponding thiol; or
        (ii) preparing an aqueous alkaline or neutral solution of the alkali metal or ammonium salt of the phenol, naphthol, anthrol or phenanthrol or the corresponding thiol by treating the phenol, naphthol, anthrol or phenanthrol or the corresponding thiol with an alkali metal hydroxide in water;
    b) dissolving an alkali metal or ammonium fluoride, chloride, bromide, hydroxide, nitrate, nitrite, sulphate, sulphite, sulphide, thiosulphate, phosphate, hydrogen phosphate, carbonate, bicarbonate, cyanate, cyanide, thiocyanate, borate, chlorate, chlorite, hypochlorite, perchlorate, chromate, dichromate or permanganate in the aqueous alkaline or neutral solution of the salt of the phenol, naphthol, anthrol or phenanthrol or the corresponding thiol;
    c) adding a partially water-miscible organic solvent to the aqueous alkaline or neutral solution so as to transfer the aqueous salt of the phenol, naphthol, anthrol or phenanthrol or corresponding thiol into the solvent while retaining separate aqueous and solvent phases;
    d) stirring or otherwise agitating the resultant two-phase system until no further salt of the phenol, naphthol, anthrol or phenanthrol or the corresponding thiol is extracted into the solvent phase;
    e) separating the solvent phase from the aqueous phase; the ratio of solvent to water in the separated solvent phase being from 0.5:1 to 10:1 w/w.

2. A process according to claim 1 in which the ratio of solvent to water m the separated solvent phase is from 0.5:1 to 5:1 w/w.

3. A process according to claim 1 in which the ratio of solvent to water m the separated solvent phase is from 0.5:1 to 3:1 w/w.

4. A process according to claim 1 in which the solvent is a cycloalkanone.

5. A process according to claim 1 in which the solvent is cyclohexanone.

6. A process according to claim 1 in which the phenol, naphthol, anthrol or phenanthrol or the corresponding thiol is a compound of the general formula (I):

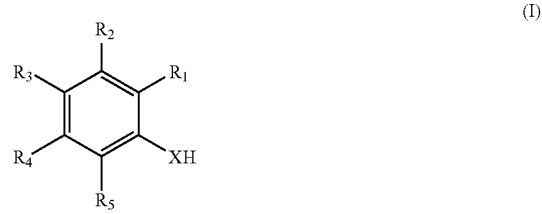

wherein X is S or O and any one of R1 to R5 is H or a substituent stable to the conditions of the process or R1 and R2 or R2 and R3 join to form a fused ring system or stable group.

7. A process according to claim 6 in which in the compound of the general formula (I), X is S or O and any one of R1 to R5 is H, halo, alkyl, haloalkyl, alkoxyalkyl, alkoxy, haloalkoxy, alkoxyalkxoxy, alkylthio, haloalkylthio, cyano, nitro, amino, alkylamino, dialkylamino, alkylcarbonyl, alkoxycarbonyl, aminocarbonyl, alkylaminocarbonyl, dialkylaminocarbonyl, phenyl, phenoxy or phenylalkyl, or R1 and R2 or R2 and R3 join to form a fused benzene ring or naphthalene ring system in which the benzene ring or naphthalene ring system optionally carries one or more of the single substituents defined for R1 to R5 above.

8. A process according to claim 7 in which the compound of general formula (I) is 2-cyanophenol or 3-hydroxybenzotrifluoride.

9. A process according to claim 1 in which the amount of alkali metal or ammonium fluoride, chloride, bromide, hydroxide, nitrate, nitrite, sulphate, sulphite, sulphide, thiosulphate, phosphate, hydrogen phosphate, carbonate, bicarbonate, cyanate, cyanide, thiocyanate, borate, chlorate, chlorite, hypochlorite, perchlorate, chromate, dichromate or permanganate used is at least 0.5 mole for each mole of the alkali metal or ammonium salt of the phenol, naphthol, anthrol or phenanthrol or the corresponding thiol present.

10. A process according to claim 1 in which the process is carried out at atmospheric pressure at a temperature of from 0° C. to 90° C.

11. A process for extracting from aqueous solution the alkali metal salt of 2-cyanophenol or 3-hydroxybenzotrifluoride, comprising:

a) (i) providing a preformed aqueous alkaline solution of the alkali metal salt of 2-cyanophenol or 3-hydroxybenzotrifluoride; or (ii) preparing an aqueous alkaline solution of the alkali metal salt of 2-cyanophenol or 3-hydroxybenzotrifluoride by treating the 2-cyanophenol or 3-hydroxybenzotrifluoride with an alkali metal hydroxide in water;

b) dissolving an alkali metal halide, sulphate or phosphate in the aqueous alkaline solution of the salt of the 2-cyanophenol or 3-hydroxybenzotrifluoride;

c) adding a cycloalkanone to the aqueous alkaline solution so as to transfer the aqueous salt of 2-cyanophenol or 3-hydroxybenzotrifluoride into the solvent whilst retaining separate aqueous and solvent phases;

d) stirring or otherwise agitating the resultant two-phase system until no further salt of the 2-cyanophenol or 3-hydroxybenzotrifluoride is extracted into the solvent phase;

e) separating the solvent phase from the aqueous phase.

12. A process according to claim 11 in which the process is carried out at atmospheric pressure at a temperature of from 0° C. to 90° C.

* * * * *